(12) United States Patent
Forman

(10) Patent No.: US 7,415,445 B2
(45) Date of Patent: Aug. 19, 2008

(54) FEATURE SELECTION FOR TWO-CLASS CLASSIFICATION SYSTEMS

(75) Inventor: George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 10/253,041

(22) Filed: Sep. 24, 2002

(65) Prior Publication Data

US 2004/0059697 A1     Mar. 25, 2004

(51) Int. Cl.
G06E 1/00        (2006.01)
G06E 3/00        (2006.01)
G06F 15/18       (2006.01)
G06G 7/00        (2006.01)

(52) U.S. Cl. .................................... 706/20
(58) Field of Classification Search .............. 706/20
See application file for complete search history.

(56) References Cited

U.S. PATENT DOCUMENTS

| | | | |
|---|---|---|---|
| 5,649,061 A | 7/1997 | Smyth | |
| 5,956,707 A | 9/1999 | Chu | |
| 6,038,527 A | 3/2000 | Renz | |
| 6,054,991 A | 4/2000 | Crane et al. | |
| 6,101,275 A | 8/2000 | Coppersmith et al. | |
| 6,182,058 B1 | 1/2001 | Kohavi | |
| 6,182,070 B1 | 1/2001 | Megiddo et al. | |
| 6,192,360 B1 | 2/2001 | Dumais et al. | |
| 6,212,532 B1 | 4/2001 | Johnson et al. | |
| 6,278,464 B1 | 8/2001 | Kohavi et al. | |
| 6,445,390 B1 | 9/2002 | Aftosmis et al. | |
| 6,701,333 B2* | 3/2004 | Suermondt et al. | 707/204 |
| 6,947,936 B1* | 9/2005 | Suermondt et al. | 707/7 |
| 7,200,604 B2* | 4/2007 | Forman et al. | 707/101 |
| 7,272,945 B2* | 9/2007 | Bash et al. | 62/180 |
| 2002/0133668 A1 | 9/2002 | Sherman | |
| 2002/0147546 A1 | 10/2002 | Kanevsky et al. | |
| 2002/0194251 A1 | 12/2002 | Richter et al. | |
| 2002/0196679 A1 | 12/2002 | Lavi et al. | |
| 2002/0196975 A1 | 12/2002 | Cahill et al. | |

OTHER PUBLICATIONS

Andrew McCallum, "Bow: A Toolkit for Statistical Language Modeling, Text Retrieval, Classification and Clustering", 1998, (http://www.cs.cmu.edu/~mccallum/bow/), Pertinant Pages: Bow and Rainbow.□□.*

Entisoft, "Math Probability Class Entisoft Tools 2.0 Object Library Version 2.1 Build 208", 1999.*

Wu et al., "Fast probabilistic analysis of sequence function using scoring matrices", Bioinformatics, vol. 16, No. 3, 2000, pp. 233-244.*

Nigam et al., "Text Classication from Labeled and Unlabeled Documents using EM", 1999, Machine Learning, , 1-34.*

U.S. Appl. No. 10/354,844, filed Jan. 29, 2003, George Henry Forman.

Yang, Yiming et al. "A comparative Study in Feature S Election in Text Categorization", Carnegie Mellon University and Verity, Inc., 9 pgs (1997).

Dietterich, thomas g., et al., "soving Multiclass Learning Problems via error-correcting output codes", Journal of Artificial Intelligence Research 2 pp. 263-286(Jan. 1995).

* cited by examiner

Primary Examiner—Michael B Holmes

(57) ABSTRACT

A two-class analysis system for summarizing features and determining features appropriate to use in training a classifier related to a data mining operation. Exemplary embodiments describe how to select features which will be suited to training a classifier used for a two-class text classification problem. Bi-Normal Separation methods are defined wherein there is a measure of inverse cumulative distribution function of a standard probability distribution and representative of a difference between occurrences of the feature between said each class. In addition to training a classifier, the system provides a means of summarizing differences between classes.

41 Claims, 4 Drawing Sheets

| CLASS | DOCUMENT NUMBER | FEATURE VECTOR | | | | | |
|---|---|---|---|---|---|---|---|
| | | "FREE" | "MONEY" | "FAST" | "LUNCH" | "MEETING" | |
| + | 1 | 1 | 1 | 1 | 0 | 0 | • • • |
| + | 2 | 1 | 0 | 0 | 0 | 0 | • • • |
| + | 3 | 0 | 1 | 1 | 0 | 0 | • • • |
| − | 4 | 1 | 0 | 0 | 1 | 1 | • • • |
| − | 5 | 0 | 0 | 1 | 0 | 1 | • • • |
| − | 6 | 0 | 0 | 0 | 1 | 1 | • • • |
| − | 7 | 0 | 0 | 0 | 0 | 0 | • • • |
| • • • | • • • | | | | | | |

BAG OF WORDS MODEL

FIG. 3
(PRIOR ART)

FEATURE SELECTION FOR TWO-CLASS CLASSIFICATION SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Field of Technology

The invention relates generally to machine learning and two-class classification systems.

Glossary

The following definitions are provided merely to help readers generally to understand commonly used terms in machine learning, statistics, and data mining. The definitions are not designed to be completely general but instead are aimed at the most common case. No limitation on the scope of the invention (see claims section, infra) is intended, nor should any be implied.

"Classification" shall mean mapping (e.g., via "feature" extraction, statistical modeling, model selection, parameter estimation, non-para-method modeling, or the like) from unlabeled records (typically represented by "features" vectors) to discrete classes; "classifiers" have a form or model (e.g., a decision tree) plus an induction learning procedure, and an interpretation procedure; some classifiers also provide scores probability estimates which can be related to a predetermined factor, such as a threshold value, to yield a discrete class decision; Support Vector Machines, Naïve Bayes, logistic regression, C4.5 decision trees, and the like, are examples of known classifiers.

"Data set" shall mean a schema and a set of "records" matching the schema (no ordering of "records" is assumed; a set of values of interest, "category" or "class."; often a schema of discrete "positives" and "negatives," as in medical tests.

"F-measure" shall mean the harmonic mean of "Precision" and "Recall, which may be represented by a relationship: 2PR/P+R, where "P" is Precision and "R" is Recall.

"Feature value" is an attribute and its value for a given record; "feature vector" shall mean a list of feature values describing a "record;" also sometimes referred to as an "example," a "case," or a "tuple."

"Induction algorithm" or "Inducer" shall mean an algorithm that takes as input specific feature vectors labeled with their class assignments and produces a model that generalizes beyond the data set; most induction algorithms generate a "model" that can then be used as classifiers, regressors, patterns for human consumption, and input to subsequent stages of "knowledge discovery" and "data mining."

"Record" shall mean each single object from which a model will be learned or on which a model will be used; generally described by "feature vectors;" also sometimes referred to as an "example," or "case."

"Knowledge discovery" shall mean the non-trivial process of identifying valid, novel, potentially useful, and ultimately understandable patterns in data.

"Machine learning" (a sub-field of artificial intelligence) is the field of scientific study that concentrates on "induction algorithms" and other algorithms that can be said to learn; generally, it shall mean the application of "induction algorithms," which is one step in the "knowledge discovery" process.

"Model" shall mean a structure and corresponding interpretation that summarizes or partially summarizes a data set for description or prediction.

"Precision" is the percentage of items classified as positive that are actually positive.

"Recall" is the percentage of actual positives that are classified as positive (see also, "tpr," infra).

2. General Background

Machine learning encompasses a vast array of tasks and goals. Document categorization, news filtering, document routing, personalization, and the like constitute an area of endeavor where machine learning can greatly improve computer usage. As one example, when searching the Word Wide Web (hereinafter "Web"), a user may develop a personalization profile, a positive class-of-interest for selecting news articles-of-interest from the millions of news articles available at any given moment in time. Machine learning for text classification is the cornerstone of document categorization, news filtering, document routing and personalization.

The potential is great for machine learning to categorize, route, filter and search for relevant text information. Good feature selection may improve classification accuracy or, equivalently, reduce the amount of training data needed to obtain a desired level of performance, and conserve computation, storage and network resources needed for training and all future use of the classifier. For example, to build and populate a Web portal or news directory, a data mining practitioner would identify a modest number of training examples for each relevant category, and then an induction algorithm can learn the pattern and identify additional matches to populate the portal or directory. In such text-based domains, effective feature selection is essential to make the learning task tractable and more accurate. However, problem sizes continue to scale up with the explosive growth of the Internet. The goals are accuracy, F-measure, precision, and recall, each of which may be appropriate in different situations.

In text classification, a data mining practitioner typically uses a "bag-of-words model:" a sample model is shown in FIG. 3 (Prior Art), in tabular format which, in practice, may have many more rows and columns (represented in the table as " . . . "). Each position in the input feature vector corresponds to a given word, e.g., the occurrence of the word "free" may be a useful feature in classifying junk e-mail, also colloquially referred to as "spam." The number of potential words often exceeds the number of training documents by an order of magnitude. Feature selection is necessary to make the problem tractable for a classifier. Well-chosen features can improve substantially the classification accuracy, or equivalently, reduce the amount of training data needed to obtain a desired level of performance. Eliminating insignificant features improves scalability, conserving computation, storage and network resources for the training phase and for every future use of the classifier. Conversely, poor feature selection limits performance since no degree of clever induction can make up for a lack of predictive signal in the input features sent to the classifier. To partially compensate for poor feature selection heuristics, a larger number of features can be selected, but this harms scalability and performance.

It has been found that selecting features separately for each class, versus all together, extends the reach of induction algorithms to greater problem sizes having greater levels of class skew. High class skew, where there are, for example many more negatives than positives, presents a particular challenge to induction algorithms, which are hard pressed to beat the high accuracy achieved by simply classifying everything as a negative majority class. High class skew in the class distribution makes it much more important to supply the induction algorithm with well-chosen features. In text classification problems, there is typically a substantial skew which worsens as the problem size scales upwardly. Returning to an earlier example, in selecting news articles that best match one's personalization profile, the positive class of interest contains many fewer articles on the Web than the negative class background, especially if the background class is e.g., "all new articles posted on the Web." For multi-class problems, the skew increases with the number of classes. It would seem that the future presents classification tasks with ever increasing skews.

Prior art methods for feature selection—i.e., deciding which features are most predictive indicators to use for training a classifier—are e.g., Information Gain (IG), Odds Ratio, the Chi-Squared Test, and the like, as would be known to practitioners skilled in the art. Each uses a specific formulaic method for selecting features discriminatively for training a classifier. Each begins by counting the number of feature occurrences of each word in the positive class ("tp") and in the negative class ("fp"). For example, in FIG. 3, the feature "free" occurs in two of the three positive training examples; tp=2, pos=3. These counts are sufficient statistics for computing the method. Improved feature selection is highly important for classification tasks to make it tractable for machine learning and to improve classifier performance.

BRIEF SUMMARY

The invention generally provides an evaluation tool and methodology for a data mining practitioner faced with a given data set for a two-class classification task who seeks to choose features that are most likely to yield best performance for training a classifier and to grasp summarily the given data set and topical context.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

FIG. 3 (Prior Art) is a table showing a "bag-ofwords" modeling.

Figure 1A:
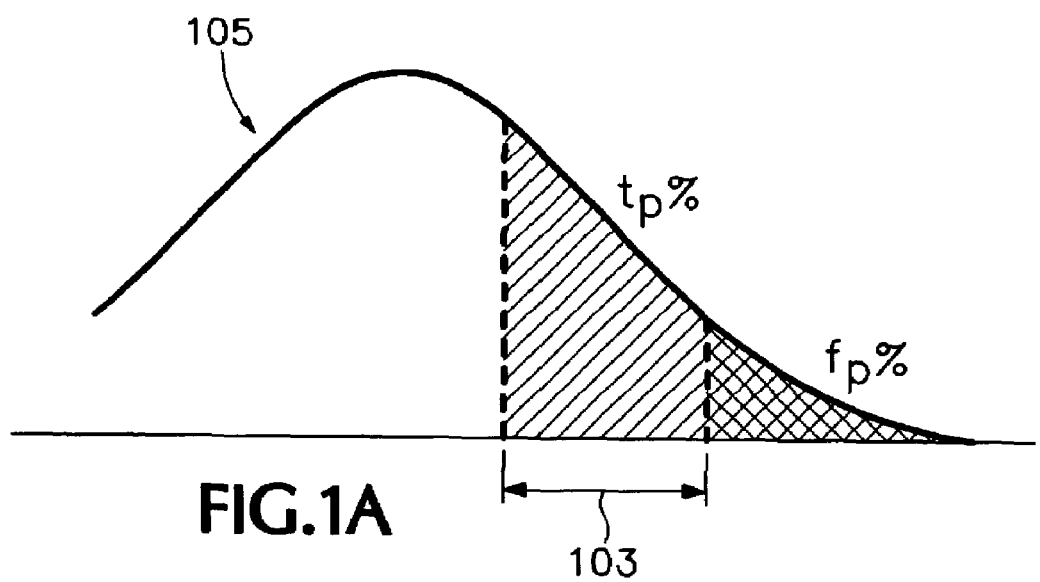
FIG. 1A is a graphical representation of Bi-Normal Separation using a Normal probability distribution view.

Like reference designations represent like features throughout the drawings. The drawings in this specification should be understood as not being drawn to scale unless specifically annotated as such.

DETAILED DESCRIPTION

In accordance with the following exemplary embodiments of the present invention, guidance to the data mining practitioner is provided as to a feature selection method most likely to obtain the best performance for the single given data set at hand for two-class classification tasks.

More specifically, an exemplary embodiment for a method and apparatus is described that provides for selecting which features to use in a two-class text classification problem. Note that "features" need not be text, for there are other domains to which the present invention may be applied; e.g., medical symptom-disease correlation. The data mining practitioner in this particular exemplary embodiment field needs a tool for deciding which features words—truncated words, predetermined phrases, or the like text elements—are the most predictive indicators to use for training a classifier. As an example of a particular problem, consider a given machine learning task of classifying junk e-mail ("spam"), distinguishing junk from non-spam e-mail. A selection tool and method is provided that meets the needs of the data mining practitioner faced with a given data set who seeks to choose those features most likely to yield the best subsequent classifier performance. The selection methods and tools provided in accordance with the exemplary embodiments described herein shall be referred to as "Bi-Normal Separation" ("BNS" hereinafter). The focus is on obtaining the best overall classification performance regardless of the number of features needed to obtain that performance.

In this exemplary embodiment, summary statistics, appropriate for representing feature values, are provided as Boolean. For two-class text classification, a Boolean indicator of whether the word occurred in the document is sufficient. To continue the spam versus non-spam example, a certain designated bit or bits of a Boolean representation of a feature might indicate whether the text body includes the word "free." Other possibilities include:

the count of the number of times the word occurred in the document, the frequency of its occurrence relative to a threshold, the frequency of its occurrence normalized by the length of the document, or the count normalized by the inverse document frequency of the word.

In situations where the document lengths vary widely, it may be important to normalize the counts by the total number of words in the document.

The task is to determine the relative value of the available specific features being considered; e.g., the relative value of the word "free," the word "money," etc., in training a classifier to determine whether a document has a high probability of being spam e-mail. The goal in the example is to determine whether each is a suitable feature to use for training a classifier having the ultimate task of discriminating between spam and non-spam e-mail or whether the specific feature-under-consideration should be discarded.

The following symbols are used:

"pos" is the number of documents in the positive class (e.g., spam);

"neg" is the number of documents in the negative class (e.g., non-spam);

"tp" and "fp" represent for a given feature—e.g., each word of a document—the occurrence count in the positive and negative classes, respectively; and "tpr" and "fpr" represent the sample true-positive-rate, P(word appears|+)=tp/pos, and the sample false-positive-rate, P(word appears|−)=fp/neg, respectively.

Applying these symbols to the exemplary "bag-of-words" illustrated by FIG. 3, pos=3
neg=4;

for the feature "free,"
tp=2
fp=1
tpr=⅔
fpr=¼;

and, for the feature "meeting,"
tp=0
fp=3
tpr=0/3
fpr=¾.

The goal is to select the best "k" features for use by a text classifier from a given number of positive, "pos," training examples and a given number of negative, "neg," training examples. For purpose of illustration, consider that there typically may be given pos=50 example spam e-mail messages and neg=1000 exemplary non-spam e-mail messages.

The overall feature selection procedure is to score each potential feature according to a particular feature selection method, whereby the best "k" features from the universe of the given data set is then used for training a classifier. Scoring a feature involves counting its occurrences in the training examples data set for positive and negative classes separately, and then computing a function.

Turning to FIGS. 1A, 1B, 2A and 2B, Bi-Normal Separation, "BNS," is the term used to describe the embodiment of the present invention for feature selection for use in a two-class classification, and is defined for a first embodiment as.

$$BNS\ score = F^{-1}(tpr) - F^{-1}(fpr) \qquad \text{(Equation 1)},$$

where $F^{-1}$ is the standard Normal distribution's inverse cumulative probability function. This returns a z-score of the Normal distribution for which the area to the left under the Normal probability distribution curve is equal to the argument. This $F^{-1}$ function is a common function in statistical libraries, e.g., in GNUPLOT™ called "invnorm(x)" or in EXCEL™ called "NORMINV(x,0,1)" In order to maximize performance by the classifier, negatively correlated features may be optionally included by taking the absolute value of the BNS score. Equivalently, one may substitute, respectively, tp'=pos−tp, for tp, and fp'=neg−fp, for fp in Equation (1). Alternately, if the BNS score is negative, it can be adjusted by a predefined negative multiplicative constant "w" to adjust the value of negative features in proportion to positive features. For example, if "w" is −1 this is the equivalent to taking the absolute value, as before. If "w" is −2, then the score of negative features will be boosted by a factor of two, causing the BNS score to prefer negative features to all but the strongest positive features—this can be useful for building classifiers whose goal is maximizing recall. Likewise, if "w" is −0.5 then negative features will be valued half as much as positive features—this can be useful for building classifiers whose focus is precision. While some classifiers work primarily with positive features, it may be argued that classifiers built from positive features only may be more transferable to new situations where the background class varies and re-training is not an option. With large class skew, negative features are numerous. It has been empirically found that negative features are particularly important to text classification. For example, when scanning a list of Web search results for the inventor's home page, a great number of hits on George Foreman the boxer occur; these could be ruled out by a classifier having negative features "boxer" and "champion" in the store.

Referring to FIG. 1A, suppose the occurrence of a given feature, e.g., a particular word in each document, is modeled by the event of a random Normal variable exceeding a hypothetical threshold. The prevalence rate "tpr" or "fpr" of the feature corresponds to the area under the curve 105 to the right of the threshold. If the feature is more prevalent in the positive class, "tp %" region, then its threshold is further from the tail of the distribution (right most portion of the curve 105) than that of the negative class. It can be seen thus that the BNS score is a measure of the separation between these two thresholds 103.

Figure 1B:
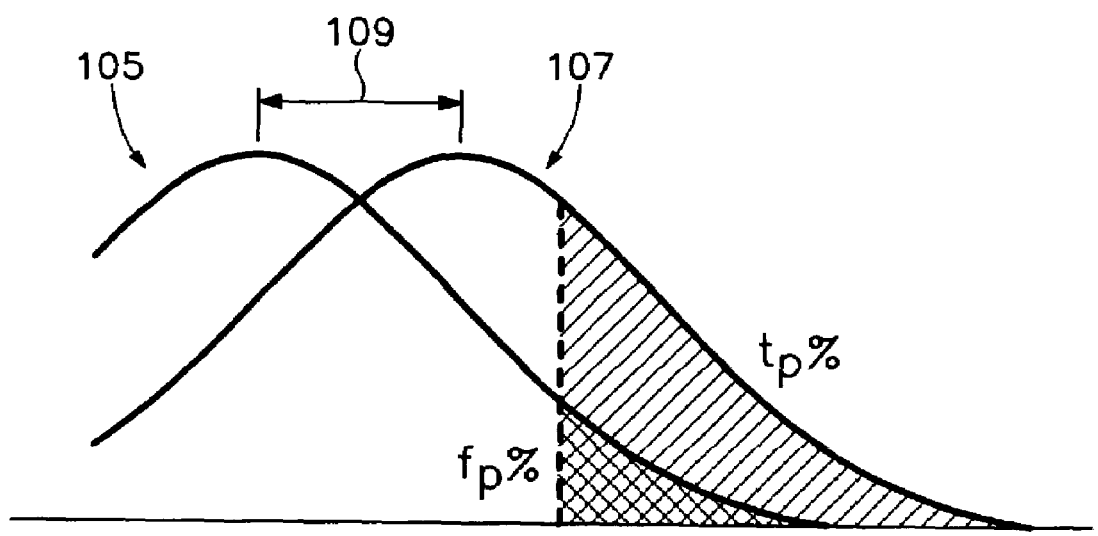
FIG. 1B is a graphical representation of Bi-Normal Separation using a Normal probability distribution in a Receiver Operating Characteristic ("ROC") threshold analysis view.

FIG. 1B is an alternative view related to ROC analysis. Here the BNS score is a measure of horizontal separation 109 between two standard Normal curves 105, 107 where their relative position is uniquely prescribed by "tpr" and "fpr," the area under the tail of each curve. Here the BNS score is also proportional to the area under the ROC curve generated by the two overlapping Normal curves.

Figure 2A:
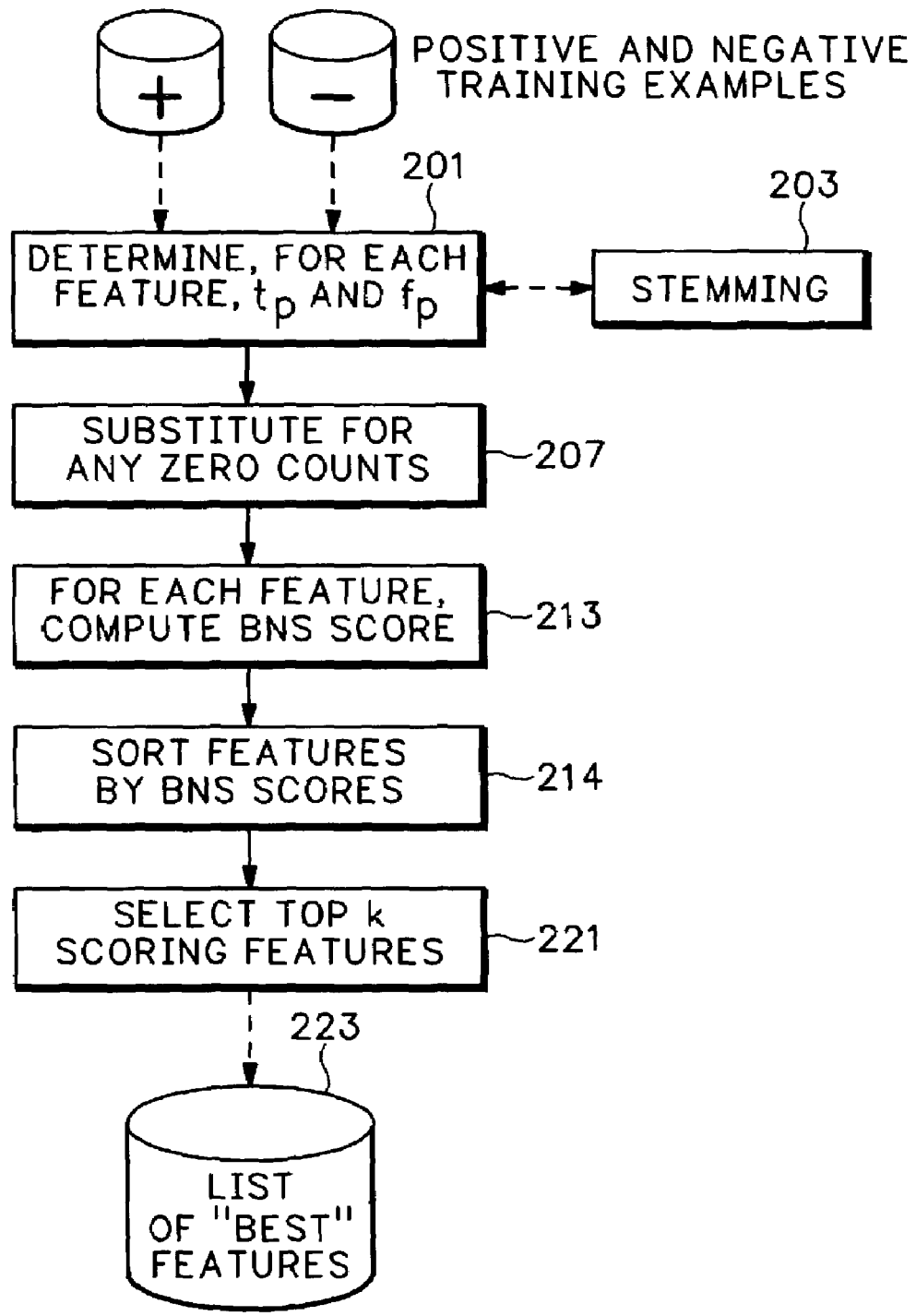
FIG. 2A is a flow chart exemplifying Bi-Normal Separation methods according to a first embodiment.
Figure 2B:
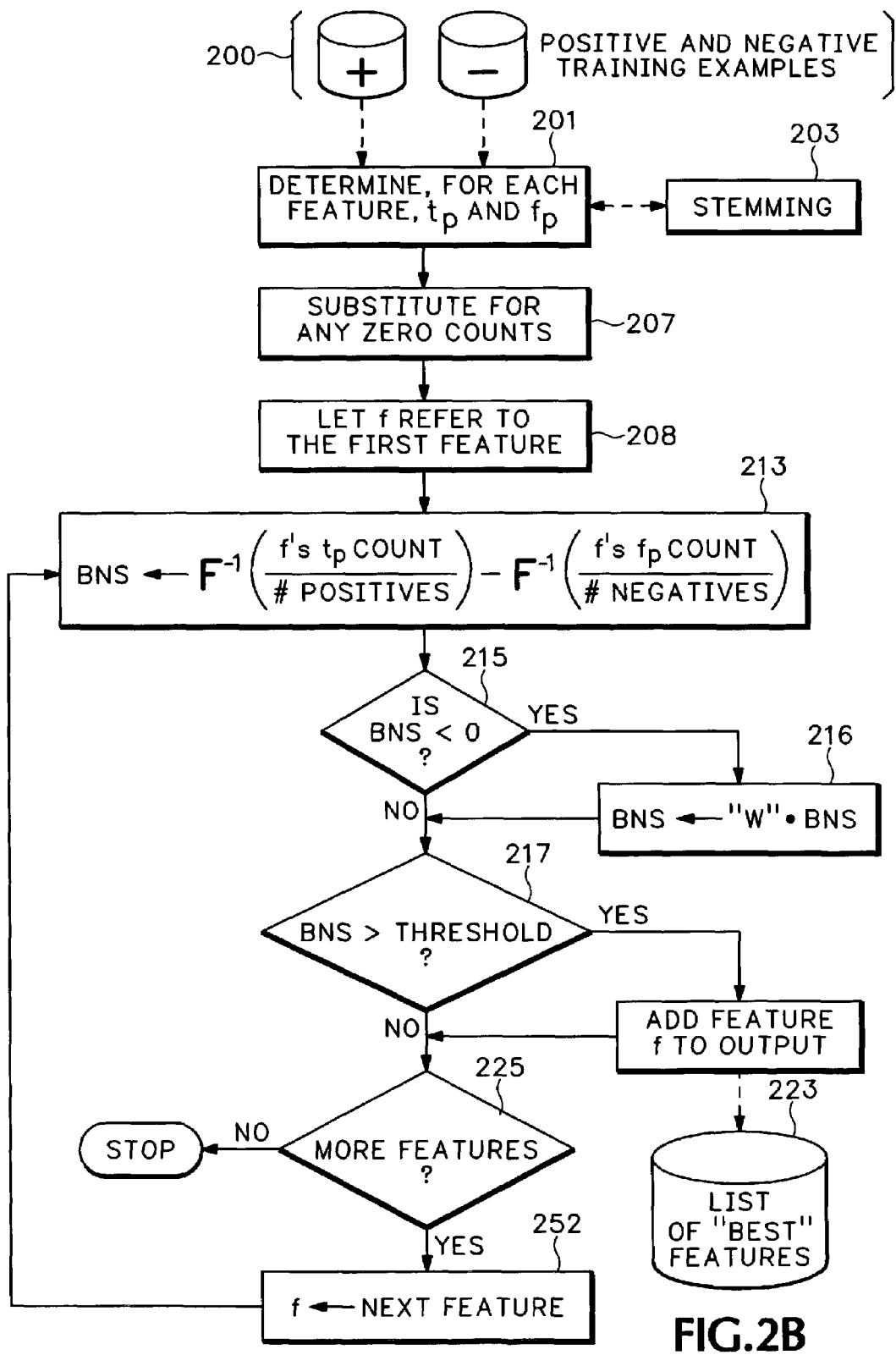
FIG. 2B is a flow chart exemplifying Bi-Normal Separation methods according to a second embodiment.

Turning now to FIGS. 2A and 2B, in accordance with an exemplary implementation of a two-class text classification problem, for each word feature appearing in the data set, a count is made 201 of the number of times the feature occurs in the set of positive examples, "tp," and the number of times it occurs in the negative examples, "fp." In the e-mail spam example, each distinct word of the collective body of training e-mail, the given data set, is a feature. Note that the common practice of known manner "stemming" or "lemmatizing" 203—merging various word forms such as plurals and verb conjugations into one distinct term—may be employed as a feature option to reduce the number of total features to be considered. If a feature occurs only in one set—that is, e.g., if tp=0, a nominal value, e.g., tp=½ (therefore tpr=0.0005 if pos=1000), may be used 207 as a substitute value, as is often practiced in the art in order to smooth counts for rarely occurring features and to avoid undefined values of $F^{-1}( )$.

A BNS score is computed 213 for each feature. The score may be thus computed in accordance with the Equation (1), optionally including taking the absolute value or weighting positively and negatively correlated features differently.

Continuing in FIG. 2A alone, the features are sorted 214 according to BNS scores. The "k" highest scoring (or other predetermined relationship) features are selected 221 for output 223. Depending on the specific classification problem to be accomplished, it is common for example to set "k" between 100 and 1000.

In the description above, the number "k" of features to select was given in advance. In an alternate embodiment, one may specify a threshold "t," and all features whose BNS score exceed this threshold are selected. For example, a likely value for the threshold may fall in the range 0.8<t<2.5, e.g., t=1.2. However, "t" may take on any real value in general. FIG. 2B depicts this alternative. Let the "+" and "−" memory symbols 200 represent the positive and negative training examples database. The steps through 207 are the same as for FIG. 2A. Steps 208 through 252 form a loop over all features analyzed. At each iteration, the BNS score is computed 213, optionally including taking the absolute value of the score, or weighting positively and negatively correlated features differently, to permit negative features, represented as flow chart branch

215, 216. In step 217, a check of whether the BNS score exceeds the threshold "t" is made. If so, YES-path, the current feature is added to the output list 223 of "best" features. Steps 225 and 252 complete the logic for iterating over all features. Note that this alternative embodiment avoids the potentially slow sorting step 214 of FIG. 2A.

Note also, that for BNS it is envisioned that in place of a Normal curve, one could use a Binomial or other distribution. For example, use of a Binomial curve distribution may provide certain performance advantages in situations where there are very few training examples for one class. However, it requires additional parameters: an estimate of the population true positive rate and the population false positive rate, for which one may use "tp/pos" and "fp/neg," the maximum likelihood estimators.

Other particular implementation options are applicable. Some other pre-filters may be commonly applied. First, rare words may be eliminated from the data set before determining the potential training set on the grounds that they are unlikely to be present to aid any given classification. For example, on a data set with thousands of words, those occurring two or fewer times (or any threshold appropriate to a specific implementation) may be eliminated. Second, overly common words such as "a," "the," "of," and the like, may be eliminated on the grounds that they occur so frequently as to not be discriminating for any particular class. Common words may be identified either by a threshold on the number of documents the word occurs in, e.g., if it occurs in over half of all documents, or by supplying what is commonly called a "stopword list." Note that stopwords are language-specific and often domain-specific; depending upon the classification task, they may run the risk of removing words that are essential predictors; e.g., the word "can" is discriminating between "aluminum" and "glass" recycling.

Another purpose to which the present invention is adaptable is in selecting a set of words that characterize the positive or negative class. That is, key differences in the data set can be determined. For example, when given collection of documents around some undefined topic, the set of words most correlated with the selected document can be determined with respect to the background class. This summarizes to the user what the topic is about, i.e., what differentiates these documents from others.

In summary, a two-class pre-classification system for determining features appropriate to use in training a classifier related to a data mining operation is thus described. Exemplary embodiments described how to select features which will be suited to training a classifier used for a two-class text classification problem. Bi-Normal Separation methods are defined wherein there is a measure of inverse cumulative distribution function of a standard Normal function and representative of a difference between occurrences of the feature between said each class.

It will be recognized by those skilled in the art that the present invention may be adapted for any two-class classification system. The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A tool comprising computer code stored on a computer memory for analyzing features in a given pair of data sets, the computer code when executed by a computer causing the computer to:
   determine counts of occurrences of each feature in the data sets;
   use the counts of occurrences for summarizing differences between the features in the pair of data sets by determining an individual score for each of said features according to an inverse cumulative probability function; and
   select at least some of the features for output according to the scores for the features, the selected features for use in performing classification of data.

2. The tool as set forth in claim 1 wherein each score is a measure computed based on the inverse cumulative distribution function of a standard probability distribution and is representative of a difference between occurrences of a corresponding feature for a first classification relationship and a second classification relationship.

3. The tool as set forth in claim 1 wherein said inverse cumulative probability function is of a Normal distribution.

4. The tool as set forth in claim 2 wherein said first classification relationship represents a positive class and said second classification relationship represents a negative class.

5. The tool as set forth in claim 4 wherein said selected features of the data sets are best suited for training a classifier for a two-class classification task.

6. A computer-implemented method for summarizing records of a data set divided into a first class and a second class, the method comprising:
   counting occurrences of each attribute in the records occurring in said first class and in said second class;
   determining a score for each of said attributes according to the counting, wherein each score is according to an inverse cumulative probability function, the scores representing differences among the attributes; and
   selecting, according to the scores for said attributes, at least some of said attributes to output for use in classification of data.

7. The method as set forth in claim 6, wherein the first class comprises a positive class, and wherein the second class comprises a negative class, the method further comprising:
   computing a true positive rate for each corresponding attribute that is based on a count of occurrences of the corresponding attribute in the positive class; and computing a false positive rate for each corresponding attribute that is based on a count of occurrences of the corresponding attribute in the negative class, wherein the score is determined based on the true positive rate and the false positive rate.

8. The method as set forth in claim 6 wherein said inverse cumulative probability function is an inverse of a standard Normal distribution function.

9. The method as set forth in claim 8 wherein said scores are indicative of suitability of using said attributes in a two-class classification task.

10. The method as set forth in claim 6, further comprising using the selected attributes to train a classifier to perform the classification.

11. A computer comprising a computer-usable medium containing computer code of a tool that is executable in the computer, the tool for determining suitability of at least one feature for a two-class classification task, the tool comprising:

means for counting occurrences of the feature in the two classes;

means for scoring said feature such that a score is provided as a measure of inverse cumulative distribution function of a standard probability distribution and is representative of a difference between occurrences of the feature between the classes; and means for outputting the feature for use in the two-class classification task.

12. The computer as set forth in claim 11, wherein the tool further comprises:

means for comparing said score to a threshold and for selecting features in relation to said threshold wherein suitability is determined.

13. The computer as set forth in claim 11, wherein the tool further comprises:

means for selecting a predetermined number of features having a score indicative of appropriateness for said two-class classification task.

14. The computer as set forth in claim 13 wherein said selecting is associated with feature selection for training a classifier.

15. The computer as set forth in claim 13 wherein said selecting is associated with characterizing key differences of said features as related to said two-class classification task.

16. The computer as set forth in claim 11, said means for scoring comprising:

means for conditionally adjusting the score by a predetermined multiplicative constant if said score is negative.

17. The computer as set forth in claim 11, said means for scoring comprising:

means for taking an absolute value of said score.

18. The computer as set forth in claim 11 wherein the score is bi-normal separation (BNS source) in accordance with the equation BNS score=$F^{-1}$(function$_A$)−$F^{-1}$(function$_B$)

where $F^{-1}$ is a standard Normal distribution's inverse cumulative probability function, and function$_A$ and function$_B$ are predetermined relevant factors for a given two-class classification task.

19. The computer as set forth in claim 18 wherein function$_A$=tpr (true positive rate) and function$_B$=fpr (false positive rate).

20. A computer-implemented method of selecting from among features from a data set for performing a classification task, comprising:

for each of said features, determining occurrence counts in positive and negative classes of said data set, respectively;

for each of said features, computing a bi-normal separation score; and selecting less than all the features for the classification task based on the computed scores.

21. The method as set forth in claim 20 comprising:

prior to said determining, stemming or lemmatizing said features.

22. The method as set forth in claim 20 comprising:

for each of said features having an occurrence count of zero, substituting a predetermined nominal count for smoothing counts for rarely occurring features and to avoid undefined values of said score.

23. The method as set forth in claim 20 further comprising:

prior to said selecting, sorting said features by respective score in an ascending or descending order.

24. The method as set forth in claim 23 wherein said selecting comprises:

selecting features best suited for said task according to said ascending or descending order.

25. The method as set forth in claim 20 further comprising:

comparing each said score to a predetermined threshold, and when said score is in a predetermined relationship to said threshold, wherein the selecting is based on the comparing.

26. The method as set forth in claim 20 comprising:

prior to said determining, eliminating features having no probable relevance to either class in said data set.

27. The method as set forth in claim 25 further comprising:

prior to said comparing, setting each said score to the absolute value thereof.

28. The method as set forth in claim 25 further comprising:

prior to said comparing, conditionally adjusting the score by a predetermined multiplicative constant if said score is negative.

29. The method as set forth in claim 20 wherein each computed bi-normal separation score is computed in accordance with the equation BNS score=$F^{-1}$(function$_A$)−$F^{-1}$(function$_B$)

where $F^{-1}$ is the standard Normal distribution's inverse cumulative probability function, and function$_A$ and function$_B$ are predetermined relevant factors for the positive and negative classes, respectively.

30. The method as set forth in claim 29 wherein function$_A$=tp/number of positives, and function$_B$=fp/number of negatives, where "tp" and "fp" represent for a given feature the occurrence counts in the positive and negative classes, respectfully.

31. The method as set forth in claim 20 wherein said classification task comprises training a classifier.

32. A computer memory including computer code that when executed by a computer selects from among features in a data set for performing a classification task, wherein selecting from among the features comprises:

for each of said features, determining occurrence counts in respective positive and negative classes of said data set, respectively, for each of said features, computing a score according to the occurrence counts in the respective positive and negative classes of said data set, and selecting less than all the features for the classification task based on the computed scores.

33. The memory as set forth in claim 32 wherein selecting from among the features further comprises:

conditionally adjusting each computed score by a predetermined multiplicative constant if said computed score is negative.

34. A system comprising a computer and a computer memory containing computer code of a feature selector, the feature selector executable in the computer and comprising:
a counter for determining counts of occurrences of features in plural classes;
a scorer using said counts of occurrences of the features in the classes for calculating bi-normal separation values for respective features; and
a comparator for comparing said bi-normal separation value for each feature to a threshold such that only features having a predetermined relationship to said threshold are selected for training a classifier.

35. The system as set forth in claim 34 wherein said scorer conditionally adjusts the score by a predetermined multiplicative constant if said score is negative.

36. A computer-usable medium containing computer code of a feature selector that is executable by a computer, the feature selector comprising:
a counter for determining counts of occurrences of a feature in respective classes;
a scorer using said count of occurrences of the feature in each class for calculating a bi-normal separation value for the feature; and
a selector for selecting the feature if the feature has a score indicative of appropriateness for a classification task.

37. The computer-usable medium as set forth in claim 36, the scorer including a mechanism for conditionally adjusting the score by a predetermined multiplicative constant if said score is negative.

38. A computer-implemented method for a classification system training task, comprising:
determining counts of occurrences of a feature in plural classes;
scoring using said count of occurrences of the feature in each class by calculating a bi-normal separation value for the feature;
comparing said bi-normal separation value to a predetermined factor; and
using the feature for the classification system training task.

39. The method of claim 20, wherein the positive class represents a set of positive examples, and the negative class represents a set of negative examples.

40. The computer memory of claim 32, wherein computing the score comprises computing a bi-normal separation score for each of the features.

41. The computer memory of claim 32, wherein the positive class represents a set of positive examples, and the negative class represents a set of negative examples.

* * * * *

UNITED STATES PATENT AND TRADEMARK OFFICE
CERTIFICATE OF CORRECTION

PATENT NO.       : 7,415,445 B2  Page 1 of 1
APPLICATION NO.  : 10/253041
DATED            : August 19, 2008
INVENTOR(S)      : George Henry Forman It is certified that error appears in the above-identified patent and that said Letters Patent is hereby corrected as shown below:

In column 9, line 54, in Claim 18, after "is" insert -- a --.

In column 9, line 54, in Claim 18, delete "(BNS source)" and insert -- (BNS) score --, therefor.

In column 10, line 43, in Claim 29, delete "the" and insert -- a --, therefor.

Signed and Sealed this

Twenty-eighth Day of April, 2009

JOHN DOLL
*Acting Director of the United States Patent and Trademark Office*